United States Patent [19]

Brdicko

[11] Patent Number: 4,567,798
[45] Date of Patent: Feb. 4, 1986

[54] APPARATUS TO MAXIMIZE SAW BLADE STIFFNESS

[75] Inventor: Jan Brdicko, West Vancouver, Canada

[73] Assignee: Cetec Engineering Co., Inc., Burnaby, Canada

[21] Appl. No.: 658,332

[22] Filed: Oct. 4, 1984

[51] Int. Cl.⁴ .......................... B27B 5/29; B26D 7/10
[52] U.S. Cl. .................................... 83/71; 51/206 R; 83/74; 83/171; 125/15
[58] Field of Search .................... 83/171, 16, 71, 74; 51/206 R; 125/15

[56] References Cited

U.S. PATENT DOCUMENTS

| 1,636,530 | 7/1927 | Nyhus | 83/171 |
| 3,247,837 | 4/1966 | Wiseman | 125/15 |
| 3,254,641 | 6/1966 | Blaine | 125/15 |
| 3,259,004 | 7/1966 | Chisholm | 83/171 |
| 3,363,617 | 1/1968 | Hoerer | 125/15 |
| 4,148,236 | 4/1979 | Holoyen et al. | 83/74 |

Primary Examiner—Frank T. Yost
Attorney, Agent, or Firm—Townsend and Townsend

[57] ABSTRACT

An apparatus is provided which is particularly adapted for maximizing lateral stiffness of a rotating saw blade. Temperature sensors measure the temperature of a rotating plate or saw blade. A displacement probe measures the degree of lateral displacement of the rotating plate or blade. A heating means heats the rotating plate or blade, so as to control the lateral stiffness of it. The displacement means is preferably an electromagnet, while the heating means is preferably one or more induction heating coils.

6 Claims, 3 Drawing Figures

APPARATUS TO MAXIMIZE SAW BLADE STIFFNESS

FIELD OF THE INVENTION

This invention relates to an apparatus which can maximize the lateral stiffness of a rotating plate, in particular a circular saw blade.

DESCRIPTION OF PRIOR ART

The cutting accuracy of a circular saw, for example an edger saw, depends upon factors which include the pre-stressing of the blade, and thermal effects during operation of the blade. In the case of thermal effects, it is well-known that the internal stress in a rotating circular saw blade depends upon the temperature distribution along the blade radius. A significant loss of blade stiffness, and hence a decrease of cutting accuracy, occurs even when the temperature differential between the inner and outer radii exceeds as little as 10° C., and complete loss of stiffness results for differentials of 30° C. or more. During operation of the blade, heat influx thereinto is created mainly by friction between the teeth of the blade and the lumber, and rubbing of the saw blade against the guides and cut lumber faces. A temperature distribution will exist along the saw blade for any specific sawing condition, and this will change as sawing conditions change, resulting in changes in lateral stiffness and hence cutting accuracy.

It has been suggested that temperature gradient along the blade, and hence lateral stiffness and cutting accuracy, can be controlled by application of controlled blade heating. Such a method has been demonstrated at the University of California by C. D. Mote. The foregoing approach was to directly sense and control the difference in temperature at two positions on the saw blade. Such a method is also suggested in U.S. Pat. No. 4,148,236 to Holoyen. The difficulty with the foregoing is that prior analysis is required for a typical saw blade to determine the optimum temperature difference therealong. In addition, subsequent changes to the internal stress in the blade caused by saw blade maintenance, render invalid the prior analysis for that blade. As well, it is very difficult to accurately measure temperature of a cutting saw blade. Other saw blade tensioning means, generally mechanical, have been disclosed in Russian Pat. No. 370,031, U.S. Pat. No. 3,247,837 to Wiseman, U.S. Pat. No. 3,254,641 to Blaine and U.S. Pat. No. 3,363,617 to Hoerer.

SUMMARY OF THE INVENTION

There is broadly provided an apparatus which comprises a displacement means for applying a lateral load to a rotating plate when the displacement means is activated. A displacement probe on the apparatus is disposed to measure the degree of lateral displacement of the rotating plate. A heating means is additionally provided for heating the rotating plate so as to effect the lateral stiffness. Preferably, the rotating plate is a disc, in the form of a circular saw blade.

The apparatus usefully additionally comprises a control means connected to the displacement means, displacement probe, and the heating means. The control means periodically activates the displacement means and activates the heating means to an extent which is a function of measurements from the displacement probe before, and during activation of the displacement means. Preferably, the control means to the foregoing action maximizes lateral stiffness of the rotating saw blade.

The apparatus described foregoing usefully also comprises mounting means for rotatably mounting a circular saw blade so as to be rotatable in a blade plane, the displacement means, displacement probe, and heating means being disposed adjacent the blade plane.

Usefully, the displacement means comprises an electromagnet, and the heating means comprises one or more induction heating coils. Where a plurality of heating coils are used, these are most usefully spaced at different radii from a centre of the blade plane.

DRAWINGS

Embodiments of the invention will now be described with reference to the drawings, in which.

DETAILED DESCRIPTION OF EMBODIMENTS OF THE INVENTION

Figure 1:
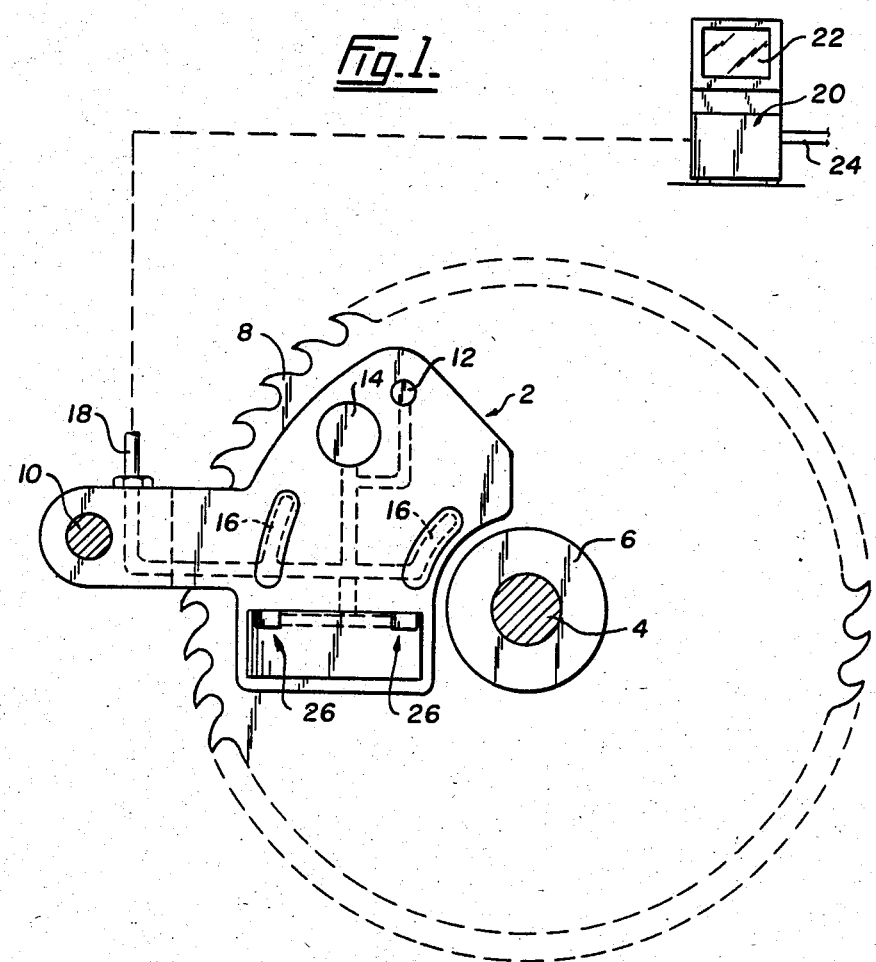
FIG. 1 is a schematic vertical cross section of an apparatus constructed according to the present invention.

Referring to the drawings, the apparatus shown therein consists of a saw guide 2, adjacent which is positioned the saw drive shaft 4 and collar 6 which together serve as mounting means for mounting the metallic circular saw blade 8 in a blade plane, the centre of which is defined by the centre of collars 6. Fixed shaft 10 extends from the saw guide 2 to a frame (not shown) to which drive shaft 4 is also rotatably fixed. Shaft 10 retains the saw guide in position relative to shaft 4, collars 6 and blade 8.

Within saw guide 2 is positioned a displacement probe 12, which is of a well-known type of construction, measuring the distance of a metallic object. Also positioned within saw guide 2 is an electromagnet 14, and two radially spaced apart induction heating coils 16. The displacement probe 12, electromagnet 14, and induction heating coils 16, are all connected through electrical conductors (shown in broken lines in FIG. 1) and hence through cable 18 to a controller preferably in the form of computer 20, and CRT display 22. The computer 20 can be of many well-known digital types, and is programmed to periodically activate the electromagnet 14. Activation of electromagnet 14 will cause the rotating blade 8 to laterally deflect somewhat (i.e. in the direction of the blade axis), the distance of deflection being sensed by displacement probe 12. The information on lateral displacement of blade 8 from displacement probe 12 is fed to computer 20 through cable 18. Computer 20 is also programmed to activate the induction heating coils 16 to an extent (i.e. either periodically or continuously) such as to maximize lateral stiffness of the rotating saw blade 8, such again being periodically measured by means of electromagnet 14 and displacement probe 12. The induction heating coils 16 of course are independently controlled by computer 20 so that they can be activated to differing extents and thereby better control the temperature gradient along blade 8 so as to increase lateral stiffness of it. Computer 20 can also be used to display on CRT display 22 if desired, such items as saw blade deflection, peak-to-peak vibration amplitude of the saw blade, and lateral stiffness. In addition, computer 20 can be programmed to display warnings or initiate shutdown or other corrective measures should the induction heating coil 16 or other components be unable to perform their task. Of course, a suitable power supply for displacement probe 12, electromagnet 14, and induction heater coils 16 is also provided and fed into computer 20 through line 24.

A further embodiment of the invention employs an alternative indirect temperature sensing means for determining the temperature of the rotating saw blade.

The widest application for indirect temperature sensing means is in circular gang saws where the saws are mounted on a common arbor at spacing as close as one inch. Lubricated guides are commonly used to ensure that the saw teeth enter the workpiece on the desired line of cut and cannot be laterally displaced by a workpiece that breaks up or has a shaky end. Water is the usual lubricant and the lubricant is applied in a manner to cause it to form a film on the surfaces of the saw. Obviously infra-red sensors cannot be used in such close quarters to detect saw temperatures and in addition the emissivity from a surface covered by a water film would not be consistent with the saw temperature. Sensing means have been developed that monitor the temperature of the water film.

Figure 3:
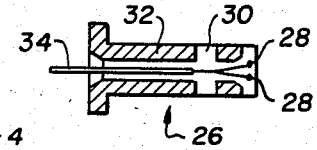
FIG. 3 is a detail of a temperature sensor.
Figure 2:
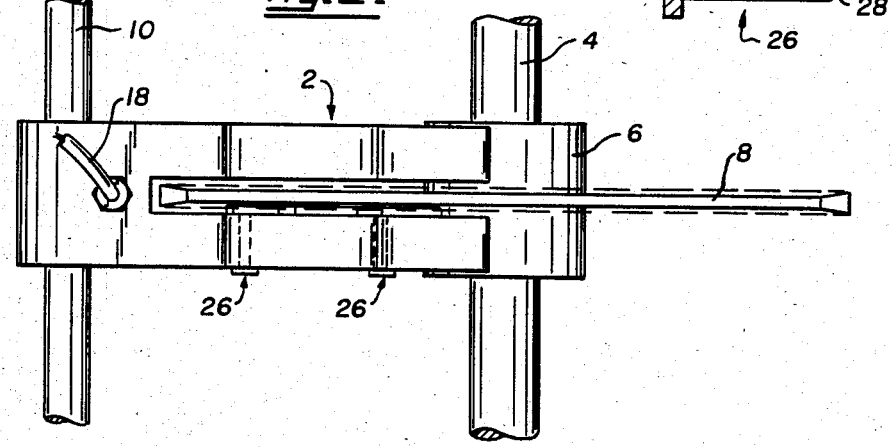
FIG. 2 is top view of a portion of the apparatus in FIG. 1.

The sensing means comprises a pair of temperature sensors 26 mounted in spaced relation in saw guide 2 on a radial line extending from as near as the saw's axis of rotation as possible to its periphery. The sensors indirectly determine the temperature of regions of the blade 8 by measuring the temperature of the lubricating water which adheres to the blade and forms the lubricating film between the guide 2 and the blade 8. It has been found that providing the lubricating film is less than 0.015 inches in thickness, as is commonly the case, the water temperature accurately corresponds to the temperature of the blade 8. The sensors, therefore, are designed to respond rapidly to small water temperature fluctuations and, as shown in FIG. 3, each comprises a pair of conventional thermistors 28 embedded in a waterproof, thermally conductive material 30, such as epoxy resin, which is housed in a carrier 32. An electrical conductor 34 directs the electrical signals generated by these components to the computer 20.

The sensors 26 are preferably adjustably mounted in the guide 2 so that it can be made flush with the guide face when in operation and retracted inwardly when the guide face requires machining.

In operation, the sensors 26 transmit electrical signals to the computer 20 which interprets them as temperature readings. The computer may then activate either or both induction heating coils 16 so as to maintain a temperature differential between the two sensors which the computer has determined to be midway between the differential characterized by "dishing" (indicating excessive heating of the center of the blade 8) and the differential characterized by "wrinkling" (indicating excessive heating of the outer periphery of the saw).

It will be noted that the need for the electromagnet 14 is eliminated with this embodiment, but the displacement probe 12 is essential and is retained and used in conjunction with the temperature sensors 26 to provide a means for measuring the exact degree of lateral displacement of the saw blade.

Final tuning of the temperature differential is then accomplished by continuous monitoring of short and long term peak to peak vibration levels of the rotating saw blade by the computer 20. Optimum stiffness of blade 8 is achieved when the vibration level of the blade is minimized.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. An apparatus comprising:
   (a) temperature sensors to indicate the temperature of a rotating sawblade at two points on a radial line.
   (b) a displacement probe disposed so as to measure the degree of lateral displacement of the circular sawblade.
   (c) heating means for heating the rotating circular sawblade so as to effect lateral stiffness thereof.

2. An apparatus as described in claim 1 additionally comprising control means connected to said temperature sensors, said displacement probe and said heating means for periodically activating said heating means to an extent which is a function of measurements from said temperature sensors and said displacement probe.

3. An apparatus as described in claim 2 wherein said control means activates said heating means so as to maximize lateral stiffness of the rotating sawblade.

4. An apparatus as described in claim 3 wherein said control means comprises additionally a heuristic control loop which is activated at each startup to determine the limits for the temperature differential along a radial line of the saw.

5. An apparatus as described in claim 3 wherein said control means comprises additionally a dedicated controller programmed to retain in memory short term and long term peak to peak vibration levels of the rotating saw blade and programmed to activate said heating means so as to minimize peak to peak vibration of the rotating saw blade.

6. An apparatus as described in claim 3 wherein the temperature sensors are thermistors embedded in thermally conductive material and located so as to measure the temperature of the lubricating film on a rotating sawblade.

* * * * *